United States Patent [19]
Sen Gupta

[11] Patent Number: 4,533,501
[45] Date of Patent: Aug. 6, 1985

[54] REFINING

[75] Inventor: Achintya K. Sen Gupta, Schenefeld, Fed. Rep. of Germany

[73] Assignee: Lever Brothers Company, New York, N.Y.

[21] Appl. No.: 486,647

[22] Filed: Apr. 20, 1983

[30] Foreign Application Priority Data

Apr. 21, 1982 [GB] United Kingdom ................. 8211563

[51] Int. Cl.[3] ............................ C09F 5/10; C11B 3/00
[52] U.S. Cl. .................................. 260/428; 260/428.5
[58] Field of Search .............................. 260/428, 428.5

[56] References Cited

U.S. PATENT DOCUMENTS

| | | | |
|---|---|---|---|
| 2,939,790 | 6/1960 | Clayton . | |
| 3,354,188 | 11/1967 | Bock et al. | 260/424 |
| 3,847,804 | 11/1974 | Pico | 260/412.5 |
| 4,062,882 | 12/1977 | Sen Gupta | 260/428.5 |
| 4,093,540 | 6/1978 | Sen Gupta | 260/428.5 X |
| 4,103,039 | 7/1978 | Mandai et al. | 260/428.5 X |
| 4,104,288 | 8/1978 | Iwanaga et al. | 260/428.5 X |
| 4,154,750 | 5/1979 | Moore et al. | 260/428.5 X |
| 4,162,260 | 7/1979 | Segers | 260/424 |
| 4,414,157 | 11/1983 | Iwama et al. | 260/428.5 |

FOREIGN PATENT DOCUMENTS

| | | |
|---|---|---|
| 49914 | 4/1982 | European Pat. Off. . |
| 813065 | 9/1951 | Fed. Rep. of Germany . |
| 55162262 | 12/1982 | Japan . |
| 764833 | 1/1957 | United Kingdom . |
| 1509543 | 5/1978 | United Kingdom . |

*Primary Examiner*—Helen M. S. Sneed
*Attorney, Agent, or Firm*—Milton L. Honig; James J. Farrell

[57] ABSTRACT

Lipids, especially crude glyceride oils and phosphatides, are refined by contact under superatmospheric pressure with ultrafiltration membrane, preferably in a miscella in a solvent permeable to the membrane. An additive solute is introduced into the lipid which is impermeable to the membrane to aid the filtration, which may be a phospholipid, gum or soap. The latter may be produced in situ by neutralizing free fatty acid present, especially with ammonia or polyvalent metal compounds and the additives may be introduced in the form of an additional crude lipid.

21 Claims, No Drawings

REFINING

INTRODUCTION

This invention relates to refining lipids including in particular refining glyceride oils, fats and phosphatides.

With the development of oil-resistant ultrafiltration membranes crude lipids, particularly glyceride oils and phosphatides can be refined by ultrafiltration by contact under sufficient pressure with a suitable semi-permeable ultrafiltration membrane, into a permeate fraction passing through the membrane and a retentate fraction held by it and containing impermeable components of the composition from which therefore the permeate fraction is made essentially free. By a judicious selection of the membrane a lipid raffinate can be obtained substantially free from impurities of greater or lesser molecular size, according to whether it is recovered from the permeate or retentate.

The solvent is selected to pass through the membrane and sufficient pressure is applied to the solution in contact with the membrane, usually from 2 to 50 $kgms/cm^2$, to overcome the osmotic pressure of the retentate components. In contrast therefore to dialysis, permeate exhibits no concentration gradient across the membrane. The membranes are preferably anisotropic, being made from man-made, oil-resistant polymers and are usually supported by porous tubes or plates to provide adequate mechanical strength, although they may also be used in the form of hollow fibres with sufficient inherent strength to withstand the applied pressures.

Lipids may be separated from non-lipids of different molecular weight and also lipids themselves may be separated from one another and especially, phospholipids separated from glycerides. In suitable non-polar solvents, e.g. hexane, chlorinated hydrocarbons, e.g. chloroform, and ethyl acetate, phospholipids are present in the form of micelles which may have molecular weights as high as 500,000 and are impermeable to ultrafiltration membranes. The polar and charged moieties of the phospholipids form the core of the micelles, the outer shells of which are non-polar, being formed by the hydrocarbon moieties of the esterified fatty acids. The phospholipids are made readily soluble in non-polar solvents, despite their polar and ionic structures, by virtue of their association in aggregated form in the micelles. Under the ultrafiltration conditions applied solvent and glycerides constituting the principal constituents of crude glyceride oils and fats readily permeate through the membrane, whereas in their micellised form the phospholipids are retained. In their micellised form also the phospholipids exert less osmotic pressure in solution.

Phospholipids themselves may also be separated from one another, i.e. by similar ultrafiltration techniques by modifying the extent of micellisation in the miscella. The modification is effected by adding an adequate proportion of hydroxylic component whereby a predetermined proportion of the phosphatides is de-micellised and passes through the membrane.

Polar components, e.g. sugars, glucosides, sterol glucosides, water, proteins and trace metals often present in crude lipid compositions, are normally insoluble in the solvents used in ultrafiltration processes, but they may be made soluble by association with components forming micelles. Moreover they may be retained with the micelles in the impermeable fraction during ultrafiltration of the miscella and thereby separated from the permeate fraction to provide for example, refined glycerides in the permeate free from these impurities, the association apparently rendering these substances themselves impermeable to the membrane.

PRIOR ART

The method of refining crude glyceride oils by dialysis is described in German Patent Specification No. 813,065 a semi-permeable membrane being contacted with a solution of the oil in a solvent permeable to the membrane. In dialysis the kinetics of flow through the membrane are provided by maintaining a concentration gradient across the membrane. It is therefore necessary to replenish solvent on the permeate side of the membrane to achieve the necessary concentration gradient. This is in contrast to the present invention and ultrafiltration methods generally, in which a superatmospheric pressure gradient across the membrane is maintained and the concentration of the permeate remains unchanged.

In U.S. Pat. No. 4,062,882 a process of refining crude lipids by ultrafiltration is described in which a miscella or solution, for example of a crude glyceride oil in hexane, is contacted with an ultrafiltration membrane under sufficient superatmospheric pressure to produce permeate and retentate fractions containing separated components of the oil in the solution which may be recovered by removing solvent from the fractions. The permeate in this process comprises refined glyceride oil essentially free from phosphatides and gums commonly occurring in crude oils and fats.

In U.S. Pat. No. 4,093,540 this method of refining of lipids is combined with the removal of additional impurities from the glyceride oil by adsorption from solution brought into contact with an adsorption agent, for example silica, which adsorbs highly polar impurities from the oil.

In European Patent Specification No. 49914 a process is described in which phospholipids are separated from one another by similar ultrafiltration, the extent of miscellisation of the phospholipids in a suitable organic solvent being modified by addition of a hydroxylic agent under the influence of which a proportion is demiscellised and thus made permeable to the membrane, being recovered in a permeate fraction essentially free from the remainder still in miscellised condition and retained by the membrane.

According to Japanese Patent Specification No. 55-162262 a polyimide semi-permeable membrane is described which may also be used to crude vegetable oil by separation of phosphatides.

In British Patent Specification No. 764,833 crude oils are simultaneously degummed and deacidified by ammonia and the process may be carried out in organic solvents.

GENERAL DESCRIPTION OF THE INVENTION

In accordance with the present invention an improved process for refining lipids is provided wherein a liquid organic phase comprising a lipid is separated into permeate and retentate fractions containing separated components of the lipid by contact under sufficient superatmospheric pressure with a semi-permeable ultrafiltration membrane and recovering refined lipid from at least one of said fractions, and wherein the retentate fraction contains a solute impermeable to the membrane for improving separation of the said fractions which is provided by an additive admixed with the lipid.

Whereas in the processes hitherto some impurities may also be held in the retentate fraction by inclusion in the phospholipid micelles, others permeate through the membrane with the glyceride fraction, including in particular free fatty acids. In accordance with one aspect of the present invention, the crude oil is first neutralised, preferably by the addition of a base, particularly ammonia or an organic ammonium derivative and more particularly a quaternary ammonium compound, to neutralise the free fatty acid in the oil. The soap thus formed is an impermeable solute which is retained in the retentate fraction by the membrane.

The invention extends to the addition of surfactants such as soap per se, as additives and also their formation in situ in the lipid by the addition of soap-forming bases These may be in addition to or as alternatives to phospholipids or other agents which may be added to provide impermeable solutes.

DESCRIPTION OF PARTICULAR EMBODIMENTS

The invention may be applied with advantage to simultaneous deacidification and degumming of seed oils containing relatively low amounts of free fatty acids and high phospholipid content, e.g. soyabean, rapeseed, sunflower and linseed oils and which are obtained by hexane extraction, without using excessive quantities of water and lye and operating at high temperatures, and without generating large quantities of acid and other ecologically harmful effluents. By removal from the crude miscella not only of phospholipids and free fatty acids, thus simultaneously degumming and deacidifying the crude oil miscella, but also simultaneously sugars, amino acids, trace metals and soaps, pigments, e.g. gossypol carotenes, a fractionation or separation is effected by the process of the invention to provide in the permeating fraction of the miscella a substantially pure glyceride oil in the solvent. The yield moreover of neutral oil is almost theoretical, providing a great advantage over conventional neutralisation and refining techniques. Ammonia is advantageous since the free fatty acids and ammonia may be recovered from the soap formed, simply by heating and the ammonia recycled. Anhydrous ammonia is particularly preferred since it forms no water in neutralisation. Small amounts of water or alcohol may however be tolerated in the solvent system and aqueous ammonia may be used, preferably containing 20 to 35% $NH_3$. Alkali metal hydroxides may also be used, e.g. NaOH and KOH, but polyvalent metal oxides and hydroxides, e.g. iron, are preferred. These form readily soluble soaps. Aluminium is also suitable. Choline is also suitable as a neutralising agent and amines may be used since the ultrafiltration may then be conducted at temperatures below those at which the amine soaps decompose, to increase the flux rate. Amines may be added in solution in a small amount of alcohol insufficient to affect the polar system.

Lipids which contain too little phospholipid to provide for the retention of sugars and other impurities which otherwise permeate through the membrane may nevertheless be treated in accordance with the invention, for example by the addition of phospholipids, e.g. lecithin, before filtration. Where the oil is to be neutralised in accordance with the invention, alkali, particularly ammonia or its organic derivatives may additionally be added to effect simultaneous deacification and removal of impurities.

A suitable additive agent for use in the present invention comprises the retentate from ultrafiltration of crude glyceride oils. The retentate must contain or provide impermeable solute material, for example but not limited to phospholipids. The retentate of an oil may therefore be added to fresh oil, either the same or different oil. Oils which are themselves rich in impermeable solutes, e.g. soyabean oil and shea oil, may similarly be added to others which contain insufficient, e.g. palm oil, and the oil mixture refined.

The invention is therefore of great benefit for refining crude glyceride oils with high free fatty acid and low phospholipid content and whether of seed or non-seed origin, including vegetable oils and marine and animal oils or fats. These normally undergo considerable losses during lye neutralisation in conventional refining techniques, besides providing difficult colour and other problems.

The invention may also be applied simultaneously to deacidify and dewax olive residue oil. This is obtained in a miscella by hexane extraction of the olive residues left after expelling virgin oil from olives. Ultrafiltration of the oil neutralised in hexane miscella in accordance with the invention is effective not only for removal of free fatty acids but also of the so-called waxes normally present in olive residue oil, the oil recovered from the permeate fraction then requiring only bleaching and deodorising for upgrading to edible fat quality.

The invention may be applied to oil fractions, for example the lower-melting fraction recovered in a liquid phase from palm oil by fractional crystallisation, usually from edible quality solvents such as acetone, for the recovery of mid-fractions which being rich in symmetrical disaturated $C_{16}/C_{18}$ triglycerides are highly prized in the confectionery industry. The lower-melting or oleine fraction has both a high iron and acid content, but both may be drastically reduced by the process of the present invention.

In yet another embodiment of the invention the agent added to the crude lipid composition comprises natural polymers found in glyceride oils and fats, for example the so-called gums in shea oil comprising isoprenoid polymers. The polymers may be recovered by ultrafiltration of a miscella of the oil source, as a retentate fraction, and this may be added directly to the crude lipid composition to be treated in accordance with the process of the invention.

DESCRIPTION OF PARTICULAR CONDITIONS

Suitable membranes may be prepared from polysulphone and other oil-resistant polymers, for example polyacrylonitrile and polyamides, and those with a nominal cut-off limit of at least 5,000 are preferred, up to 300,000 and particularly from $10^4$ to 100,000. Ultrafiltration is preferably carried out at pressure from 2 to 50 bar, and at from 10° to 70° C. The higher temperatures give higher flux rates, but other factors including the resistance of the membrane to higher temperatures, may limit the temperature selected. Polyimide and polyacrylonitrile membranes are also suitable. The above cut-off limits refer to determinations made by aqueous protein solutions.

Membranes are usually provided in an aqueous vehicle which must be removed before use in the process of the invention. Conditioning for this purpose is effected by washing the membrane to replace the water by a non-hydroxylic, non-acidic solvent. Hydroxylic and acidic substances must be substantially absent in the process.

Miscella for refining may be made in non-hydroxylic, non-acidic solvents, hexane and paraffins generally being preferred, although acetone and esters of good quality are suitable. The solvent must be permeable.

The oil concentration in the miscella is preferably 10 to 70 wt %. Additives other than bases, e.g. vegetable gum and phospholipid, are preferably added in an amount from 1 to 20% by weight of the lipid. Bases are preferably added in stoichiometric amounts sufficient to neutralise the free fatty acid present in the lipid.

The temperature at which the ultrafiltration is effected is not critical provided that the stability of the membrane is unaffected. Preferably a temperature range of 10° to 70° C. is used for this reason, but membranes may be capable of use at higher temperatures.

Other lipids which may be refined in accordance with the invention include animal fats and marine oils.

In the accompanying Examples acid values were measured by alkali titration and therefore included ammonium soaps which react as free fatty acid. The acid value of a permeate fraction of a neutralised oil therefore indicates the presence of soap in the permeate. In the accompanying data these FFA values are reported as a percentage and being based on oleic acid with a molecular weight of 200, represent half the acid value in mg KOH/gm oil. Additionally, thin layer chromatographic analysis was carried out on the permeate to determine the presence of fatty acids and their respective soaps. Where metal hydroxides were added as bases, the permeate oil was measured for their metal content by atomic adsorption spectra. By these means it was shown that in all the following Examples soap formed by neutralisation was retained by the membrane. In all the following Examples also, the phosphorous content in the permeate fraction was always less than 10 ppm by weight of the lipid, excepting in Example 8 where further explanation is provided. Solvent was in all cases removed by evaporation from the permeate.

EXAMPLE 1

4 liters of rapeseed oil (FFA 0.12) obtained in a miscella by hexane extraction of the pressed seeds, containing 28.6% total lipids and approximately 700 ppm phosphorus as phosphatide gums were saturated with gaseous ammonia at 50° C. and ultrafiltered at 22° C. and 4 bar through equipment by Messrs Amicon, comprising a stirred ultrafiltration cell 401S made of Teflon-coated stainless steel and a DIAFLO PM 10 polysulphone membrane with a nominal cut-off limit of 10,000.

The hexane solvent was distilled from 3.6 liters of the permeate obtained with an average flux rate through the membrane of 42 liters/m$^2$/hr and the refined oil recovered was compared with crude oil recovered from the crude miscella and also with refined oil recovered similarly by ultrafiltration from the crude oil but without neutralisation. Substantially complete removal of phosphorus was effected, together with 94.3% of fatty acid. The acid content of the oil filtered without neutralisation was unchanged.

EXAMPLE 2

Example 1 was repeated on a miscella of 28 wt % crude soyabean oil in hexane, neutralised by adding the stoichiometric amount (0.14% by weight of the oil) of 33 wt % aqueous ammonia. The refined oil recovered from the permeate was compared as before, with the crude oil and also with the permeate obtained without initial neutralisation. Further particulars appear in Table I.

TABLE I

| | P ppm | FFA % | Colour |
|---|---|---|---|
| Crude | 906 | 2.8 | 70 Y + 6.8 R |
| Un-neutralised permeate | 6 | 2.8 | 70 Y + 5.6 R |
| Neutralised permeate | 4 | 0.09 | 40 Y + 4 R |

The membrane filtration thus reduces phosphatide measured as P, by 99.6% and FFA by 96.8%. The membrane filtered oil is also significantly lighter coloured as measured in a 2-inch cell of a Lovibond Tintometer.

EXAMPLE 3

Refined fish oil was obtained by ultrafiltration as described in Example 1, from a hexane miscella containing 28% by weight crude fish oil with FFA 7%. To another part of the crude miscella, 12% of commercial soyabean lecithin was added by weight of the oil present. Another part of the oil was first neutralised by the addition of the stoichiometric amount (0.42 wt % of $NH_3$) of 33% by weight aqueous ammonia and the same amount of lecithin was added to the neutralised oil in a hexane miscella. Each of the miscellae was ultrafiltered as before. The refined oil recovered in each case is compared in Table III with the crude oil and the raffinate first obtained.

TABLE II

| Oil | FFA % | Colour | Miscella flux rate l/m$^2$ · h |
|---|---|---|---|
| Crude | 7.0 | 40 Y + 24 R + 2B | — |
| Permeate I | 6.9 | 10 Y + 2 R | 10 |
| Permeate II (lecithin) | 6.2 | 20 Y + 3 R | 14 |
| Permeate III (lecithin + $NH_3$) | 0.5 | 20 Y + 3 R | 27 |

Addition of the lecithin to the crude oil resulted in the substantially complete removal of protein and simultaneous addition of ammonia further resulted in the removal of 93% FFA and increased the ultrafiltration flux rate.

EXAMPLE 4

A liquid (oleine) fraction was recovered from Malayan palm oil by fractional crystallisation at 4° C. in 20 wt % acetone and was dissolved, with 9% of its weight of soyabean lecithin, in twice its weight of a petrol fraction, a boiling point 69° to 73° C. and 0.55 weight % of $NH_3$ added as 0.88 S.G. ammonia as the stoichiometric amount for neutralisation. The neutral miscella so obtained was ultrafiltered through a Patterson Candy International tubular module fitted with a BX3 membrane made of polysulphone, with a cut-off limit of approximately 10,000 nominal molecular weight, at various temperatures between 20° C. and 45° C. at which the flux rate was measured. The results are shown in Table III.

TABLE III

| Temperature-Flux relation | |
|---|---|
| Temperature °C. | Flux rate $l/m^2 \cdot h$ |
| 20 | 52.0 |
| 25 | 56.3 |
| 30 | 58.0 |
| 35 | 62.5 |
| 40 | 68.4 |
| 45 | 71.5 |

Raffinate oil was recovered from the permeate at each temperature and compared in Table V with the crude oleine by measurement of FFA, colour and extinction coefficients in the visible and UV spectra using 1 inch cells. Further details are given in Table IV.

TABLE IV

| Analyses of starting palm oleine and the permeate oils | | | | |
|---|---|---|---|---|
| Obtained at (°C.) | FFA % | Colour Lovibond 2" cell | UV abspn/l cm cell E 1% (hexane soln) at 232 nm | 268 nm |
| Starting oil | 9.2 | 40 Y 40 R | 5.38 | 1.96 |
| 20 | 0.9 | 20 Y 16 R | 4.48 | 1.73 |
| 25 | 2.0 | 20 Y 20 R | 4.57 | 1.74 |
| 30 | 2.2 | 20 Y 23 R | 4.57 | 1.74 |
| 35 | 2.4 | 20 Y 23 R | not determined | |

Table IV shows that the effectiveness of deacidification is dependent on temperature. Also, the removal of oxidised fats as shown by the Lovibond colour and UV-absorption at max 232 and 268 nm, corresponding to conjugated diene and triene maxima is temperature dependent, but above 35° C. these effects are no longer observed.

The effect of temperature on the efficiency of the deacidification is no doubt due to decomposition of the ammonium soaps at elevated temperatures with the formation of free fatty acids and evolution of ammonia. Since the free fatty acids are not incorporated in the micellar aggregates, their level in the permeate oil increases with increasing temperature.

EXAMPLE 5

100 g palm oleine as used in Example 4 was dissolved in 200 g hexane and 5.5 g of a solution in methanol containing 71.6% choline hydroxide was added. The permeate oil obtained after ultrafiltration of the solution through a polyacrylonitrile membrane IRIS 3042 of Messrs Rhone-Poulenc with a cut-off limit of 25,000 at 20° C., but otherwise described in Example 1, showed the following analysis:

FFA=0.26%

Lovibond Tintometer colour at 2 inch cell=20 Y+14 R.

The flux rate was 82.6 $l/m^2/h$ compared to flux 68 $l/m^2/h$ without the addition of choline hydroxide.

These results clearly demonstrate that the choline soaps of the palm oil fatty acids are retained even without the addition of phospholipid. Simultaneously other impurities such as traces of iron and pigments are also removed.

EXAMPLE 6

100 g of the crude palm oleine used in Example 5 was mixed with 0.85 g of ferric oxide and the mixture heated under vacuum at 120° C. for about 30 minutes when the ferric oxide went completely into solution. The fat was cooled down to about 30° C., dissolved in 200 g hexane and ultrafiltered as described in Example 5 and the permeate oil analysed with the following results:

FFA=0.16%

Fe=0.1 ppm

Lovibond Tintometer colour at 2 inch cell=20 Y+4 R.

EXAMPLE 7

3 kg of olive residual oil obtained by the hexane extraction of pressed olives and with FFA content of 10.5%, was mixed with 300 g defatted soyabean lecithin and the mixture dissolved in 8.17 kg hexane. 64 g of a 33% aqueous solution of ammonia was added to the hexane miscella and the whole ultrafiltered at 3.8 bar and 20° C. using the Patterson Candy International module and membrane already described in Example 4. After 11 liters of permeate were recovered, 10 liters of hexane were added to the unfiltered balance and 9 liters more of permeate recovered. The 20 liters of permeate obtained on distillation yielded 2628 g of oil. The average oil flux rate amounted to approximately 6 $kg/m^2.h$.

As before comparisons were made without lecithin and/or ammonia, and analyses of the products in each case are compared in Table VI with that of the crude residue oil.

TABLE V

| Olive oil additive | Oil flux ($kg/m^2$ h | FFA % | E 1%/l cm 232 nm | 270 nm |
|---|---|---|---|---|
| Nil (unfiltered) | — | 10.5 | 4.08 | 1.18 |
| Nil | 1.2 | 13.5 | 4.07 | 1.07 |
| Lecithin | 4.5 | 10.5 | 3.67 | 0.97 |
| $NH_3$ + lecithin | 6.0 | 0.56 | 2.94 | 0.73 |

It is apparent that the addition of $NH_3$ and lecithin not only increases the oil flux, but also effects a better removal of FFA and, from the absorption data, of oxidised material.

EXAMPLE 8

Crude rice bran oil with a free fatty acid value of 16 wt % and 300 ppm P, exhibited Lovibond colour in a 2-inch cell of 70 Y+13 R+10 B. A hexane miscella comprising 33° wt % of the oil was refined by ultrafiltration through various membranes at 20° C. and 4-barr pressure. The refined oil recovered from each permeate exhibited FFA values of 30-32% and a Lovibond colour of 9 R+60 Y+7 B. The crude oil was then refined as before, but with the addition of sufficient gaseous ammonia to saturate the miscella except for the PM 10 test, when sufficient 0.88 S.G. aqueous ammonia was added to neutralise the oil. These were then repeated with the further addition of commercial defatted soyabean lecithin in the amounts 14% (IRIS), 4% (PM 10), 10% (BM 50) and 5% (BM 1000) all by weight. The results appear in columns 1 and 2 of Table VI and demonstrate the substantial improvement effected in the quality of the refined oil by the presence in the crude miscella of these agents.

In addition, trace metals, glycolipids and waxes were efficiently removed in all cases while the level of unsaponifiables was reduced.

The addition of ammonia, either gaseous or in aqueous solution, very significantly reduces the presence of free and combined acids in the permeate and improves colour. The presence of lecithin added to the oil gives a further reduction in fatty acid content in the permeate, showing that both the micelle-forming agents are effective in a purification of the permeate.

EXAMPLE 9

A hexane miscella comprising 15 wt % crude shea oil containing approximately 2% natural gums, chiefly of polyisoprenoid nature, was saturated with gaseous ammonia and filtered as described in Example 1, using an IRIS 3042 membrane with a cut-off limit of 25000. The Lovibond colour with a 1-inch cell fell from 8.0 Y+8.3 R+6.9 B in the crude oil to 8.0 Y+0.8 R in the raffinate recovered from the permeate, and the total fatty acid from 14.5 wt % to 0.7 wt %, compared with 8.0 Y+1.4 R and 15.0 for permeate recovered in a control test without the addition of ammonia to the crude oil, clearly indicating the benefit of the ammonia addition to the crude oil. More than 95% of gums and trace metals, e.g. Fe, Ca, Mg, Na and Mn were all removed from the oil by the ultrafiltration.

TABLE VI

| MEMBRANE | | | PERMEATE* | | | | | | | | |
|---|---|---|---|---|---|---|---|---|---|---|---|
| | | | FFA % | | Lovibond Colour | | | | | | |
| Polymer | Type | Cut-off | 1 | 2 | R | Y | B | R | Y | B |
| Acrylonitrile | IRIS 3042 Rhone-Poulenc | $2.5 \times 10^4$ | 2.5 | 0.5 | 9 | 40 | 3 | 3 | 40 | 0.9 |
| Sulfone | PM 10 Amicon | $10^4$ | 1.3 | 0.4 | 6 | 60 | 7 | 3 | 60 | 2 |
| Amide | BM 50 Berghof | $5 \times 10^3$ | 2.5 | 0.3 | 4 | 40 | 1 | 3 | 40 | 0.4 |
| Amide | BM 1000 | $10^5$ | 1.5 | 0.6 | 5 | 45 | 1 | 4 | 40 | 0.4 |

*contained less than 10 ppm P except for IRIS membrane where 32 ppm.

2.5 wt % of 33% aqueous ammonia solution was added to a low-melting fraction of shea oil containing 0.2% gum. The free fatty acid of the shea oleine before filtration was 20 wt % and its Lovibond colour in a 1-inch cell was 40 Y+11 R+1.2 B. After filtration as above described, these fell to 1.8 wt % and 20 Y+3.1 R in the raffinate oil recovered from the permeate. No gum was detected in the filtrate.

EXAMPLE 10

Palm oil was fractionated at 4° C. from a 20 wt % solution of acetone. The low-melting (oleine) fraction recovered from the filtrate, dissolved in hexane at 33% concentration, was saturated with gaseous ammonia and 2% shea gum residue added by weight of the oil present, before ultrafiltration as described in Example 9. The gum residue consisted of 55% hydrocarbon gums and included 3% FFA in addition to small amounts of metals. corresponding changes in FFA and Lovibond colour were from 9.0 to 0.8 and 40 Y+34 R to 30 Y+7 R. In addition, 80% of the caretonoids were removed measured to 1% extinction in a 1 cm cell at 446 nm, measured by analysis carried out according to the method described by H Pardun in "Analyse der Nahrungsfette" published by Verlag Paul Parley, Berlin, 1976, pages 181-82.

EXAMPLE 11

Crude rapeseed oil obtained by pressing the seeds was dissolved in twice the weight of hexane and ultrafiltered through a DIAFLO PM10 membrane of Amicon with a cut-off 10,000 at 20° C. and 4 bar using the equipment described in Example 1. The permeate obtained was distilled to remove hexane and the oil obtained as residue analysed. In a parallel experiment the same crude rapeseed oil was dissolved in hexane, the theoretical amount of 43 wt % aqueous solution of KOH added to the miscella for neutralisation of the free fatty acids present and the resultant mixture stirred vigorously for 20 minutes and then ultrafiltered under similar conditions. The results are shown in Table VII.

TABLE VII

| Sl. No. | | P | FFA % | K ppm | Fe ppm | Cu ppm | S ppm | Lovibond 2" Red | Yellow | Blue |
|---|---|---|---|---|---|---|---|---|---|---|
| 1 | crude | 294 | 1.3 | 39 | 3.2 | 0.3 | 19 | 8.2 | 80 | 5.1 |
| 2 | ultrafiltered without any addition | 7 | 1.3 | 2 | 0.13 | 0.04 | 9 | 6.0 | 70 | 1.2 |
| 3 | ultrafiltered with the addition of KOH | 3 | 0.03 | 0.7 | 0.01 | 0.01 | 4 | 4.2 | 50 | — |

Both the ultrafiltered oils were bleached 1.5% acid activated bleaching earth Tonsil ACCFF (Südchemie, Munich) at 105° C. under Vacuo and deodourised at 230° C. and stored at room temperature. The raffinate obtained from 3 was organoleptically acceptable for more than 12 weeks, whereas the raffinate obtained from 2 was acceptable only for 6 weeks.

EXAMPLE 12

100 g crude cottonseed oil (origin Malawi) was dissolved in 200 g hexane and ultrafiltered using a polysulphone membrane as in Example 11. The equipment was used as described in Example 1, at 4 bar pressure but at 20° C.

In a parallel experiment the oil miscella was saturated with gaseous ammonia prior to ultrafiltration. The results are given in Table VIII.

TABLE VIII

| Oil | P (ppm) | FFA (%) | Gossypol (%) |
|---|---|---|---|
| Crude | 666 | 6.2 | 0.38 |
| Ultrafiltered without any addition | 7 | 6.0 | 0.11 |
| Ultrafiltered after addition of ammonia | 7 | 0.3 | 0.01 |

The results show that ultrafiltration without any addition removes 99% of phospholipids, 3% free fatty acids and 61% of the pigment gossypol. But ultrafiltration with the addition of gaseous ammonia not only removed 99% of phospholipids, but also 95% free fatty acids and 97.4% of the pigment gossypol. The additional effect of the ammonium salts is indicated by the more efficient removal of the pigment gossypol.

EXAMPLE 13

100 g of crude cottonseed oil (origin Pakistan) was dissolved in 200 g hexane using a polyamide membrane BM 100 of BM 100 of Messrs Berghof, Tübingen, Germany, with a cut-off limit of 10,000, in equipment otherwise the same as described under Example 1. In a parallel experiment the stoichiometric amount of 40% aqueous KOH solution required to effect neutralisation was added to the miscella which then stirred vigorously for 20 minutes and ultrafiltered.

TABLE IX

| Oil | P (ppm) | K (ppm) | FFA (%) | Gossypol % | Lovibond 1" | $E^{1\%}_{1\,cm}$ 232 nm | $E^{1\%}_{1\,cm}$ 268 nm |
|---|---|---|---|---|---|---|---|
| crude | 630 | 210 | 6.8 | 0.79 | 70 Y + 20 R + 0.8 B* | 24.8 | 7.3 |
| ultrafiltered without any addition | 4 | 1.5 | 6.5 | 0.4 | 30 Y + 6 R* 70 Y + 60 R + 1 B | 15.0 | 5.0 |
| ultrafiltered with addition of KOH | 2 | 0.8 | 0.2 | <0.01 | 20 Y + 4 R | 2.6 | 0.8 |

*measured in ½ inch cell

The results show that the K-soaps formed in situ are retained by the membrane and enhance the removal of the pigment gossypol and oxidise glycerides (as shown by measurement of UV-extinction at max 232 nm for conjugated dienes and 268 nm for conjugated trienes).

EXAMPLE 14

Crude grapeseed oil containing phospholipids was dissolved in double its weight of hexane and ultrafiltered at 20° C. and 4 bar pressure, through a polysulphone membrane PM 10 of Messrs Amicon with a cut-off limit of 10,000. In an additional experiment in accordance with the invention, ammonia gas was passed through the miscella to neutralise the free fatty acid in the crude oil. The neutralised miscella was then ultrafiltered as before. The results are shown in Table X.

TABLE X

| Oil | FFA % | Chlorophyll pigments (ppm) | Fe (ppm) | P (ppm) |
|---|---|---|---|---|
| Crude oil | 4.0 | 57.6 | 21.7 | 65 |
| Ultrafiltered oil without any addition | 3.6 | 47.6 | 0.3 | 5 |
| Ultrafiltered oil with the addition of ammonia | 0.5 | 16.8 | 0.4 | 5 |

It is apparent that the ammonium soap substantially supplements the removal of chorophyll pigments.

EXAMPLE 15

The liquid (oleine) fraction of palm oil used in Example 4 with 9.2% FFA was dissolved in acetone to provide a 25% miscella which was ultrafiltered at 20° C. and 5 bar through a polyacrylonitrile membrane IRIS 3042 of Messrs Rhône-Poulenc with a cut-off limit 25,000 without any significant reduction of FFA in the permeate fraction.

The acetone miscella of the same oleine fraction was then neutralised with the theoretical amount of a 45 wt % methanolic solution of choline base and again ultrafiltered as before, yielding permeate with less than 0.05% FFA. Thin layer chromatographic examination confirmed that the permeate contained no free fatty acid, choline base, or choline soaps.

I claim:

1. Improved process for refining lipids by ultrafiltration wherein a liquid organic phase comprising a lipid is separated into permeate and retentate fractions containing separated components of the lipid by contact under sufficient superatmospheric pressure with a semi-permeable ultrafiltration membrane and recovering refined lipid from at least one of said fractions, and wherein the retentate fraction contains a solute impermeable to the memberane for improving separation of the said fractions and the improvement comprising adding an additive selected from the group consisting of shea gum, surfactant, soap and mixtures thereof to the lipid.

2. Process according to claim 1 wherein from 1 to 20% of additive by weight of lipid is added to the lipid.

3. Improved process for refining lipids by ultrafiltration wherein a liquid organic phase comprising a lipid is separated into permeate and retentate fractions containing separated components of the lipid by contact under sufficient superatmospheric pressure with a semi-permeable ultrafiltration membrane and recovering refined lipid from at least one of said fractions, and wherein the lipid contains free fatty acid which is neutralised by an additive comprising a base added to the lipid to form soap in the organic liquid phase which is retained by the membrane.

4. Process according to claim 3 wherein the base comprises ammonia or an amine.

5. Process to claim 3 wherein the lipid is saturated with ammonia gas.

6. Process according to claim 3 wherein the base comprises choline.

7. Process according to claim 3 wherein the base comprises an alkali metal hydroxide.

8. Process according to claim 3 wherein the base comprises a compound of a polyvalent metal.

9. Process according to claim 3 wherein the base comprises an aluminium or iron oxide or hydroxide.

10. Improved process for refining lipids by ultrafiltration wherein a liquid organic phase comprising a lipid is separated into permeate and retentate fractions containing separated components of the lipid by contact under sufficient superatmospheric pressure with a semi-permeable ultrafiltration membrane and recovering refined lipid from at least one of said fractions, and wherein the retentate fraction contains a solute impermeable to the membrane for improving separation of the said fractions which is provided by an additive added to the lipid, the said additive comprising crude vegetable oil and a base in sufficient amount to neutralise free fatty acid present in the said oil.

11. Process according to claim 10 wherein sufficient crude oil is added to provide the said solute in an amount from 1 to 20% by weight of the lipid.

12. Process according to claim 1 wherein the lipid comprises soyabean, cottonseed, palm, rapeseed, grapeseed, olive or shea oil.

13. Process according to claim 1 wherein the lipid comprises a marine oil.

14. Improved process for refining lipids by ultrafiltration wherein a liquid organic phase is separated into permeate and retentate fractions by contact under sufficient superatmospheric pressure with a semi-permeable ultrafiltration membrane, wherein the said liquid phase is essentially free from hydroxylic and acidic solvents and comprises a crude glyceride oil miscella in solvent permeable to the membrane, and recovering refined lipid from at least one of said fractions by removing solvent therefrom, the improvement wherein an additive is added to the said oil for improving separation of the said fractions which is selected from the group consisting of surfactants and phosphatides.

15. Process according to claim 14 wherein the said solvent is selected from the group consisting of hexane, acetone and alkyl esters.

16. Process according to claim 14 wherein the concentration of the crude oil in the solvent is from 10 to 70% by weight.

17. Process according to claim 1 wherein a membrane is used having a cut-off limit from 10,000 to 300,000 with reference to aqueous protein solutions.

18. Process according to claim 1 wherein a membrane is used having a cut-off limit from 25,000 to 100,000 with reference to aqueous protein solutions.

19. Process according to claim 1 wherein the membrane used is selected from a group consisting of polyacrylonitrile, polysulphone, polyamide and polyimide anisotropic membranes.

20. Process according to claim 1 wherein the lipid is contacted with the membrane at a temperature from 10° to 70° C.

21. Process according to claim 1 wherein the lipid is contacted with the membrane at a pressure from 2 to 50 bar.

* * * * *